March 28, 1950   E. C. LANDON   2,501,683
CONVERTIBLE ELECTRIC APPLIANCE
Filed March 4, 1946   2 Sheets-Sheet 1

INVENTOR
ESTHER C. LANDON
BY Cook & Robinson
ATTORNEYS

March 28, 1950 — E. C. LANDON — 2,501,683
CONVERTIBLE ELECTRIC APPLIANCE
Filed March 4, 1946 — 2 Sheets-Sheet 2
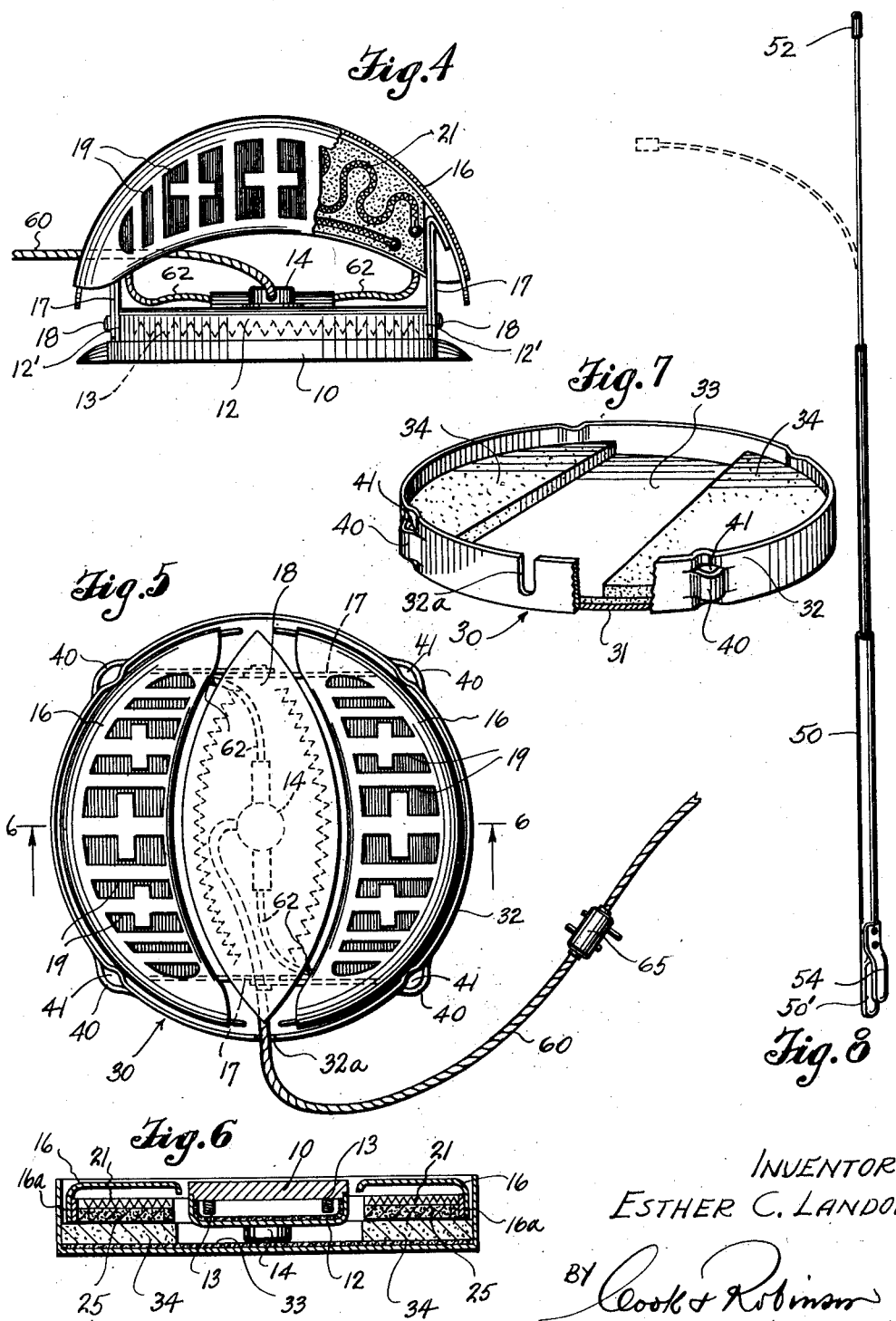
INVENTOR
ESTHER C. LANDON
BY Cook & Robinson
ATTORNEYS Patented Mar. 28, 1950

2,501,683

UNITED STATES PATENT OFFICE 2,501,683

CONVERTIBLE ELECTRIC APPLIANCE

Esther C. Landon, Seattle, Wash.

Application March 4, 1946, Serial No. 651,903

5 Claims. (Cl. 219—25)

This invention relates primarily to electrically heated appliances and it has reference more particularly to certain improvements in electrically heated flat irons that adapt them to be converted to a number of uses other than that of ironing; it being the principal object of this invention to provide a novel, convertible electric appliance including as its main element, an electrically heated flat iron that, by reason of the present novel improvements therein, is especially suited to the needs of travelers for ironing, for drying articles, and for those various other uses to which electrically heated hot plates might be put.

It is also an object of the invention to provide an electrically heated, light-weight iron, having a pair of handle forming members pivotally attached thereto that may be brought together to provide a handle for the iron when used as such, and which may be opened apart and thereby brought into the plane of the flat iron body, to serve, in this extended position, together with the heated iron to form a hot plate that is adapted to all the usual uses of a present-day hot plate.

It is also an object of the invention to provide a device of the character above stated, with which certain accessories may be used to adapt the device, when converted to uses of a hot plate, to serve also for the drying of clothes or other articles thereover.

Another object of the invention is to provide a convertible, electrical appliance in combination with a special protective tray or case to which attachment parts may be removably applied for the support of the articles to be dried, and which tray, by itself, serves as a convenient and practical protective container for parts, both while in use and in storage.

Still further objects of the invention reside in the details of construction of parts, in their combination and mode of use, as will hereinafter be fully described.

In accomplishing these and other objects of the invention, I have provided the improved details of construction, the preferred forms of which are illustrated in the accompanying drawings, wherein:

Fig. 4 is a side view of the device in the form shown in Fig. 1.

Fig. 5 is a plan of the present appliance with the handle forming portions thereof adjusted into the plane of the flat iron body and the device inverted and placed in the tray for use as a hot plate.

Fig. 6 is a cross section, taken on line 6—6 in Fig. 5.

Fig. 7 is a perspective view of the protective tray to which the heated parts may be applied for use and in which they may be placed for storage or packing.

Fig. 8 is a perspective view of one of the telescoping flexible standards that are adapted to be applied to the base plate for the support of clothes or articles to be dried over the hot plate.

Figure 1:
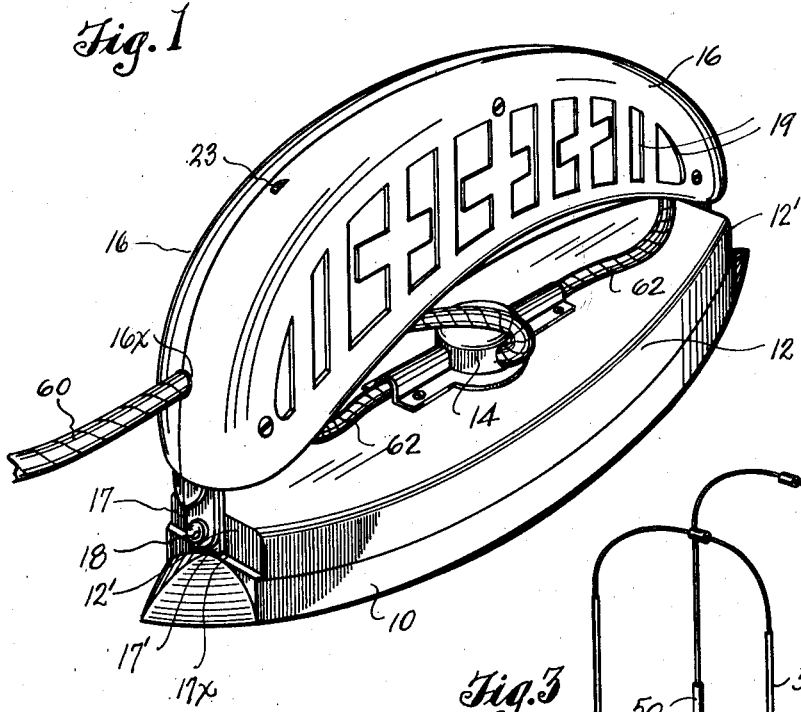
Fig. 1 is a perspective view of a convertible, electric appliance embodied by the present invention; the device being shown as converted for use as a flat iron.

Referring more in detail to the drawings:

With the understanding that the present appliance be so made as to best adapt it to the needs of the traveller and that it be most convenient for use in any or all of its adaptations, also easy to pack or store in a suitcase or the like, and light in weight, I have provided a device having a flat iron body 10 of vertical thickness that is much reduced below that of the common types of present-day electric flat irons and which is tapered uniformly from a medial point to both ends. As shown best in Figs. 1, 4 and 5, the flat iron body 10 is shown as having its opposite side edges equally radially curved and its bottom surface flat and pointed at opposite ends. Fixed to by suitable means and overlying the body 10, is a metal housing 12 of suitable kind within which electrical resistance elements of suitable kind, are contained and through which electric current may be caused to flow for the purpose of heating the iron body for its various uses. The specific form of heating elements is not material to this invention, and such elements have only been diagrammatically indicated by reference numeral 13 and might be in strip or coil form.

The housing 12 is primarily a protection for the heating elements 13 and serves also as a mounting for a distributor box 14 wherein circuit connections are made with a service line or cord. As shown in Fig. 6, the housing 12 is interiorly insulated by a layer of asbestos or other suitable heat resisting material applied thereto as indicated at 15.

Hingedly or pivotally attached to the opposite end walls of the housing 12, as best shown in Figs. 1, 4 and 5, are the paired handle forming members 16 and 16. Each of these members is equipped at its ends with attaching or hinge legs 17, having inner end portions thereof fixed rigidly in the plates forming the handle members and having their outer end portions attached by hinge or pivot pins 18, to the housing end walls 12'. Each of the paired handle members is of the same shape and size as the other and when they are both folded upwardly and closed together, as in Figs. 1 and 2, they meet in exact registration and coact to form a smooth and comfortable handle or hand hold for the handling of the flat iron in its normal uses for the ironing of clothes and the like.

Figure 2:
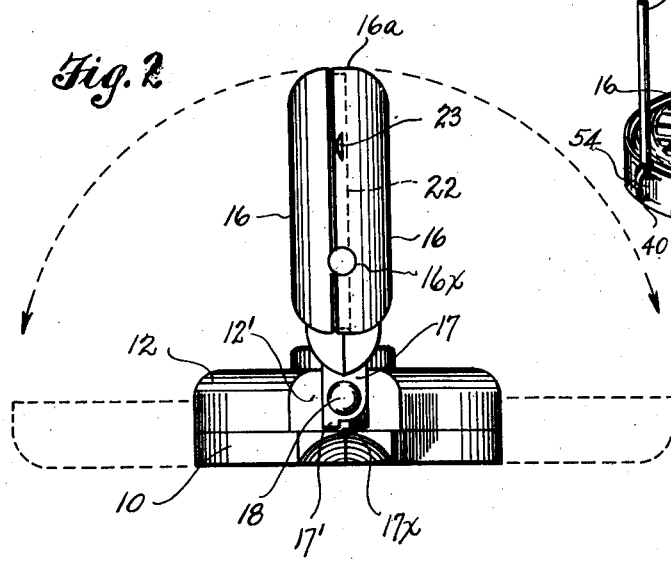
Fig. 2 is an end view of the same.

At least one leg 17 of each handle member has a short extension 17' at its pivoted end that is adapted, upon swinging the handle member to its upright position, to engage against a flat stop surface 17x on the iron body to maintain rigidity of the handle relative to the iron when in upright position as in Fig. 2.

In this connection, it is desired to point out that the outer wall surfaces of the two handle forming members 16—16 are formed by flat metal plates, the outer peripheral portions of which are turned laterally in smooth, rounded flanges 16a with edges that will close tightly together as noted in Figs. 1 and 2, when brought together in handle form. The outer edge curvature of the two handle members is such that when these parts are opened apart and brought into the same plane, as in Fig. 5, they will coact with the flat iron to form a circular plate having a heating surface, the center of which is at the center of the iron body. Also, the plates that form the outside surfaces of the handle portions are ornamentally formed with slots or openings 19 in close relationship for easier outflow of heat that is supplied within the handle members by the heating of electric resistance elements 21 contained therein; these being shown in Fig. 6.

When the handle members are closed together as shown in Fig. 1, an inwardly formed flange of one fits within the edge of the other as indicated at 22 in Fig. 2, and they may be yieldingly held together by any suitable form of spring clip or latch device, one of which is indicated at 23 in Figs. 1 and 2.

From their closed together position, as shown in Figs. 1 and 2, the handle members 16—16 may be swung outwardly away from each other as indicated by the dotted line position of these parts in Fig. 2. In this open position, the grilled outside surfaces of the handle members and the flat bottom surface of the flat iron body lie in the same horizontal plane. Then to convert the appliance to the uses of a hot plate, the device, with the handles in this open position, is inverted, so that the flat bottom surface of the flat iron and the grilled surfaces of the handle members may be made to serve as a support for a cooking utensil or the like.

In the cross sectional showing of the device in Fig. 6, it is observed that the heating elements 21 are mounted on and are also held in place in the handle members by flat, relatively thick porcelain plates 25 that are fitted in the handles flush with the edges of the inturned flanges. When the handles are closed together, these plates lie flatly together.

To facilitate the use of the appliance as a hot plate, I have provided, as an accessory, a special protective tray for receiving and supporting the parts in the inverted position. This tray is best shown in Fig. 7 and is designated in its entirety by reference numeral 30. As therein shown, it comprises a circular metal bottom plate 31 with a vertical peripheral flange 32; the depth of which flange is such as to house the plate therein and to support it with its heating surface substantially flush with the top edge of the flange.

Applied within the base portion of the tray is a layer of insulation 33, and at opposite sides of the tray are flat pads 34 and 34 composed of a material of suitable insulating and protective character for the intended uses of these pads.

By reference to Fig. 6, it will be understood also that by opening the handle parts 16—16 apart for the purpose of converting the appliance to the uses of a hot plate and then, upon inverting the device, it may be placed flatly within the tray and will assume the position as shown in Figs. 5 and 6. In this combination of parts, the handle members will rest flatly upon the pads 34—34 and the space between the pads will then accommodate the flat iron body 10. The diameter of the appliance in this open position is such as to be received in the tray with some clearance for easy application or removal.

The tray 30 thus serves not only as a protective housing and support for the heated parts in their functional uses, but also serves as a container for the device when in storage or when packed in a suitcase or trunk.

Figure 3:
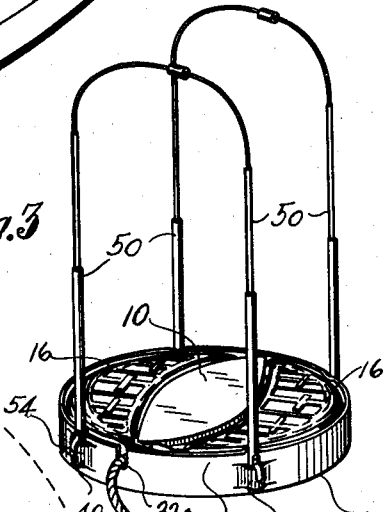
Fig. 3 is a perspective view of the device when converted to the uses of a hot plate and for clothes drying.

As observed in Figs. 3 and 7, the tray has a notch 32a formed in the side wall 32 at a location intermediate the pads 34 to receive the electric supply cord of the appliance when placed in the tray as described.

Also, as seen in Fig. 1, a recess, as at 16x, is provided in the handle for passage of the service cord.

In order to best adapt the device for clothes drying purposes, I have provided the side walls of the tray 30, at intervals about same, with outstruck loops 40, thus providing upwardly opening sockets 41 designed to receive the shaped lower end portions 50' of flexible telescoping standards 50 therein, for their support. As seen in Fig. 3, I prefer to use four of these standards 50 and to provide for joining the upper ends of paired standards by a sleeve 52 to form a sort of umbrella arrangement for the support of articles that are to be dried by heat arising from the heated elements. These standards may be removed when not in use, and telescoped to a minimum length that permits them to be stored in the tray beneath the iron body. Spring clips as at 54 are attached to the lower ends of the standards to engage the loops to hold them against accidental displacement.

For supplying electric current to the heating elements of the iron and handle members, I have equipped the device with an electric service cord 60 of usual kind which leads to the distributor block 14 on the iron body. From this block, connecting lines 62—62 lead to the handle elements. A two-heat switch as at 65 is interposed in the line connections for selective control of the heating and also switches may be associated with the connection for the selective use of the handle and flat iron elements.

Assuming the device to be so constructed, it is quite readily apparent that it may be readily and easily converted to its various uses. When used as an electric flat iron, only the iron body would be heated. When used as a hot plate, the handle elements as well as the flat iron elements could be heated.

In its flattened position in the tray, the device can be conveniently stored in a suitcase or trayeling bag. This tray, in use of the device as a hot plate, gives adequate protection against burning the supporting object. The tray also is a convenient and practical support for the standard 50. While the device is intended to be made as light in weight as practicable, it is apparent that for household use only it could be made larger and heavier if so desired without departing from the spirit of the invention.

It will be added further that in the use of this device, it may be found practical or convenient to cover the iron body with an insulating pad of asbestos or any other suitable material to protect the hand of the user from heat in the iron body. Also, a suitable pad or holder might also be provided to apply over the handle members as a protection against heat that might be transmitted into the handles from the iron body.

Having thus described my invention, what I claim as new therein and desire to secure by Letters Patent is:

1. A device of the character described comprising a flat-iron body, handle members hinged to said body and adapted to be brought together to form a handle therefor, and to be swung away from each other into the plane of the flat iron body at opposite sides thereof to form a hot plate, and heating elements in said handle members and in the flat iron body.

2. A device of the character described comprising a flat iron body, a pair of handle forming members hinged at their ends to opposite ends of the said body and adapted to be brought together directly above and longitudinally of the body to provide a handle therefor and to be swung away from each other into the plane of the iron body at opposite sides thereof to coact therewith to form a hot plate, electric heating elements in the flat iron body, electric heating elements in the handle members, and means for supplying current to said elements.

3. A device of the character described comprising a flat iron body, a pair of handle forming members hinged at their ends to opposite ends of the said body and adapted to be brought together directly above and longitudinally of the body to provide a handle therefor and to be swung away from each other into the plane of the iron body at opposite sides thereof to coact therewith to form a hot plate, electric heating elements in the flat iron body, electric heating elements in the handle members, and means for supplying current to said elements; said handle elements having their outer surfaces covered with flat, grilled plates that, in the open position of said members, lie in the plane of the flat bottom surface of the flat iron body.

4. In combination, a shallow protective tray and a hot plate appliance removably contained therein for its functional uses as a hot plate; said hot plate appliance comprising a central body portion of flat iron form and designed for use as such, opposite side members hinged at their ends to ends of the body and adapted upon removal of the appliance from the tray to be folded together to provide a handle for the body for its use as a flat iron, and electric heating elements in the handle forming members, electric heating elements in the flat iron body, and means for supplying current to said elements and for its control.

5. A device of the character described comprising a flat iron body, handle members hinged to said body and adapted to be brought together to form a handle therefor, and to be swung away from each other into the plane of the flat iron body at opposite sides thereof to form a hot plate, and heating elements in said handle members and in the flat iron body, and a tray in which said device may be supported for use as a hot plate.

ESTHER C. LANDON.

REFERENCES CITED

The following references are of record in the file of this patent:

UNITED STATES PATENTS

| Number | Name | Date |
| --- | --- | --- |
| 920,569 | Hegarty et al. | May 4, 1909 |
| 1,293,010 | Bloch | Feb. 4, 1919 |
| 1,466,139 | Michie | Aug. 28, 1923 |
| 1,914,190 | Herr | June 13, 1933 |
| 1,994,284 | Martinek | Mar. 12, 1935 |
| 2,040,369 | Fischer | May 12, 1936 |
| 2,201,491 | Huffman | May 21, 1940 |

FOREIGN PATENTS

| Number | Country | Date |
| --- | --- | --- |
| 137,846 | Great Britain | June 24, 1920 |